Patented Dec. 1, 1953

2,661,316

UNITED STATES PATENT OFFICE 2,661,316

COSMETIC COMPOSITION CONTAINING LANOLIN IN HIGH CONCENTRATION

Herbert A. Martini, Chicago, Ill., assignor to Jesse Luther Peacock, Chicago, Ill.

No Drawing. Application June 5, 1953, Serial No. 359,945

5 Claims. (Cl. 167—90)

This invention relates to a cosmetic preparation in which lanolin is contained in high concentration and it is an object of this invention to produce a composition of the type described in which the composition contains lanolin in high concentration and is in a liquid state.

In the preparation of a cosmetic of the type described, it is desirable to make use of a diluent for lanolin which is capable, in itself, of functioning as an emollient and in which the lanolin may be dissolved in high concentration to form a solution of liquid consistency. The development of a composition of this character has been faced with a number of problems arising out of the peculiarities of the materials and the limitations with respect to materials that can be used in the cosmetic field. Very special problems which have been difficult to overcome have been presented by these conditions because of the limitations with respect to materials capable of being used as solvents and because of the inability in the past to take lanolin into solution in concentrations greater than about 10 percent by weight. Even then, the solutions which have been formed have had a consistency characteristic of a cream or paste.

Because of the presence of isocholesterol compounds and cholesterol esters of higher fatty acids in lanolin and because of the desirability to make use of a diluent capable of functioning as an emollient, attempts have been made to make use of fatty acid alcohols as the solvent medium. Solutions have been made using cetyl alcohol as the solvent for lanolin but when cetyl alcohol is present in amounts greater than 10 percent by weight, the solution formed has a consistency of a cream or paste. Increasing the amount of cetyl alcohol at the expense of other diluents which might be used, such as mineral oil, tends to increase the thickness of the cream rather than to reduce the preparation to a liquid state as might have been expected. Increasing the amount of lanolin over and above 10 percent by weight in the preparation offers the same reversal to the direction sought and a cream of still heavier consistency results. These same properties have been secured with other fatty acid alcohols which are homologues or of similar construction as cetyl alcohol.

Contrary to the results which have been secured with cetyl alcohol, it has been found that when oleyl alcohol is used as the solvent medium and is present in amounts greater than about 10 percent by weight, lanolin can be taken into solution in concentrations considerably greater than 10 percent by weight and that the solution formed remains of a liquid consistency when the concentration of lanolin is as high as 50–60 percent by weight. Unlike the results secured with cetyl alcohol and other alcohols of related character, the use of oleyl alcohol in increasing amounts imparts greater fluidity to the solution with the result that it becomes possible with oleyl alcohol to produce liquid solutions in which lanolin is present in amounts up to 50–60 percent by weight. It appears that the differences responsible to the formulation of lanolin in a solution of liquid consistency may reside in the presence of unsaturated carbon to carbon linkages in the fatty acid group of the alcohol which either enhances the relationship between the alcohol and lanolin so as to enable the formation of a liquid solution or it might be that the liquid character of the oleyl alcohol at room temperature functions to influence the formation of a liquid solution when lanolin is dissolved therein. Whatever the reason, it appears that other closely related unsaturated fatty acid alcohols of low melting point, such as linoleyl alcohol, may be substituted at least in part for oleyl alcohol to produce a liquid solution in which lanolin is present in high concentration.

With oleyl alcohol as the solvent for lanolin, it is possible to reduce the cost of the preparation while also improving the characteristics thereof as a cosmetic preparation for certain uses by the embodiment of relatively high concentrations of oils, such as castor oil, peanut oil, or other vegetable oils, the selection of which depends greatly upon the use which is to be made of the preparation.

When the lanolin solution is compounded into a cosmetic for use as a dressing on skin, it is preferred to make use of a diluent such as mineral oil which is not absorbed into the skin and remains on the surface thereof. The mineral oil which may be the only other ingredient present with lanolin and oleyl alcohol, other than antioxidants, perfumes and the like, can be compounded into the preparation in amounts ranging up to 70 percent by weight since it has little, if any, influence on the solvency or the liquid character of the lanolin solution.

Peanut oil and the like vegetable oils may also be used as the diluent in compositions of the type described but, unlike mineral oil, it becomes more or less absorbed into the skin and is therefore used where the skin preparation or cosmetic is intended to impart some therapeutic effect.

The following formulations, given by way of illustration, but not by way of limitation, are representative of compositions embodying features of this invention:

Example 1

35.0 percent by weight lanolin
12.0 percent by weight oleyl alcohol
0.05 percent by weight antioxidant (Sustane)
0.4 percent by weight perfume oil
52.55 percent by weight peanut oil

Example 2

25.0 percent by weight lanolin
10.0 percent by weight oleyl alcohol
0.05 percent by weight antioxidant (Sustane)
0.4 percent by weight perfume oil
64.55 percent by weight mineral oil

Example 3

45.0 percent by weight lanolin
20.0 percent by weight oleyl alcohol
0.05 percent by weight antioxidant (Sustane)
0.4 percent by weight perfume oil
34.55 percent by weight mineral oil Since solution of the materials forming the cosmetic composition is substantially complete to form a stable composition of liquid consistency, the order in which the materials are combined is not critical although it is preferred to combine the oleyl alcohol with the lanolin followed by dilution with the other materials.

It will be understood that changes may be made in the details of formulation and application without departing from the spirit of the invention, especially as defined in the following claims.

I claim:

1. A cosmetic which is liquid at room temperature consisting essentially of lanolin in amounts greater than 20 percent by weight in solution with oleyl alcohol in amounts greater than 10 percent by weight in the cosmetic composition, the remainder being composed of oil as a diluent with less than 1 percent by weight perfume oils and antioxidants.

2. A cosmetic which is liquid at room temperature consisting essentially of lanolin in solution in high concentration consisting essentially of lanolin present in amounts ranging from 20-60 percent by weight, oleyl alcohol in an amount greater than 10 percent by weight and mineral oil in amounts up to 70 percent by weight.

3. A cosmetic which is liquid at room temperature consisting essentially of lanolin in solution in high concentration consisting esesntially of lanolin present in amounts ranging from 20-60 percent by weight, oleyl alcohol in an amount greater than 10 percent by weight and vegetable oil in amounts up to 70 percent by weight.

4. A cosmetic which is liquid at room temperature consisting essentially of lanolin in solution in high concentration comprising lanolin in an amount ranging from 20-60 percent by weight, oleyl alcohol in an amount greater than 10 percent by weight, with mineral oil forming the remainder containing a small amount of perfume oils and antioxidants present in an amount less than 1 percent by weight.

5. A cosmetic which is liquid at room temperature consisting essentially of lanolin in solution in high concentration comprising lanolin present in an amount ranging from 20-60 percent by weight, an unsaturated fatty acid alcohol which is liquid at room conditions present in an amount greater than 10 percent by weight of the cosmetic composition with an oil selected from the group consisting of mineral oil and vegetable oils forming the remainder of the composition containing a small amount of perfume oils and antioxidants.

HERBERT A. MARTINI.

References Cited in the file of this patent

Schimmel: Briefs Number 69, December 1940.
Janistyn: Reichstoffe, Seifen, Kosmetika. 1950, Huthig, Heidelberg, vol. II, page 264.
De Navarre: The Chemistry and Manufacture of Cosmetics, N. Y., 1941. D. Van Nostrand, pages 281, 465.
Augustin: Deutsche Parfumerie Zeitung, vol. 25, 1930, pages 46 and 47.